April 5, 1927.  A. W. KOGSTROM  1,623,844
END CONNECTION FOR VEHICLE SPRINGS
Filed Feb. 4, 1925   2 Sheets-Sheet 1
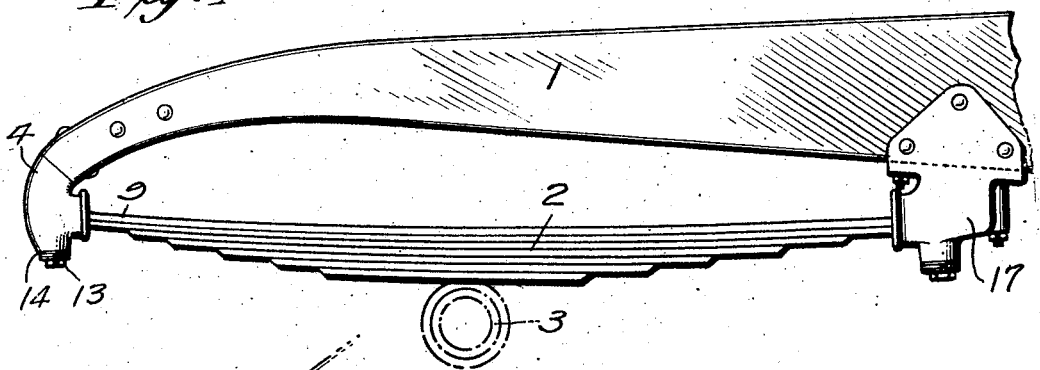
Fig. 1
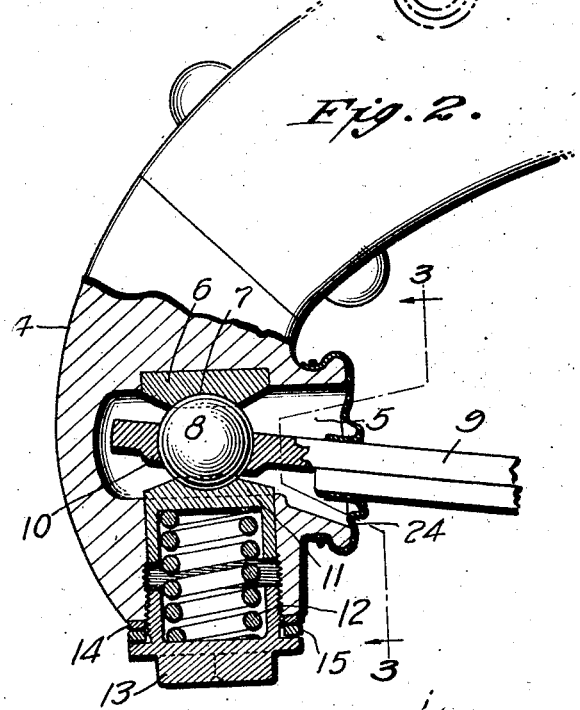
Fig. 2
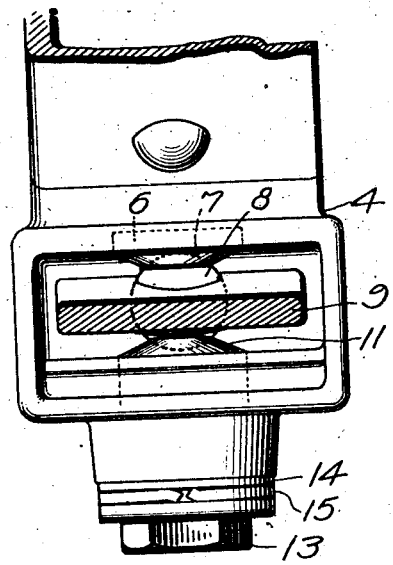
Fig. 3
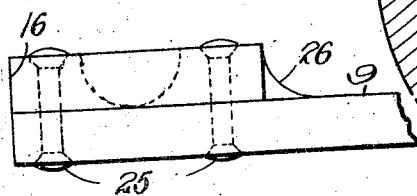
Fig. 5a
Fig. 4
Inventor
Axel W. Kogstrom
By
Attorneys

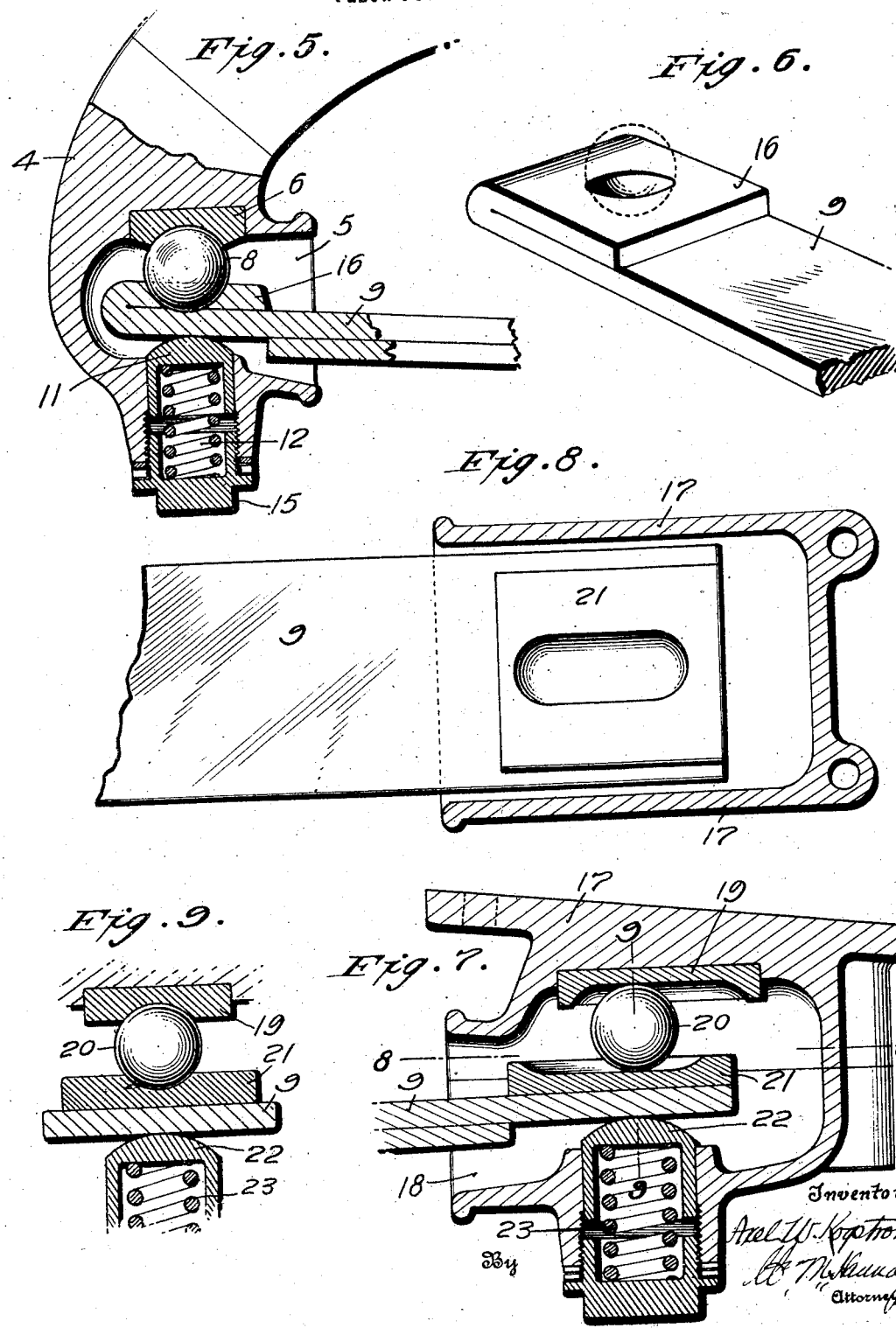

Patented Apr. 5, 1927.

1,623,844

UNITED STATES PATENT OFFICE.

AXEL W. KOGSTROM, OF UPPER DARBY, PENNSYLVANIA, ASSIGNOR OF ONE-HALF TO ALLISON F. H. SCOTT, OF PHILADELPHIA, PENNSYLVANIA.

END CONNECTION FOR VEHICLE SPRINGS.

Application filed February 4, 1925. Serial No. 6,830.

This invention relates to improved means for connecting the ends of springs to the chassis elements or frame of vehicles.

The object of the invention is to provide means so constructed that wear on the parts at bearing points of such connections is reduced to a minimum thus to prolong their useful life; and further to provide a connection which permits of the spring flexing in all directions without transmitting the torsional stresses from the springs to the frame of the vehicle. This latter makes for greater comfort and improved riding qualities of the vehicle to which the construction is applied as well as saving the frame from the constant racking which it gets through the ordinary end connections of supporting springs.

Another object of the invention is to provide a bearing which does away with frequent lubrication and attention required by pin type spring suspension.

The housing can be made oil tight by providing a gaiter or boot made from flexible material arranged with a tight fit around the spring leaves, the other end of the gaiter being attached to the flared end housing.

It is the usual construction, especially on motor vehicles, to connect the springs to the chassis in such a way that one end is fastened by a horizontal pin or hinge connection, while the opposite end is similarly supported in a so-called shackle to permit londitudinal flexing of the spring. Such shackle usually comprises parallel depending arms hinged at their upper ends to the side frame of the vehicle, while their lower ends are connected by a pin to which the end of the spring is also secured. In connections of this kind, the bearing surfaces are relatively large, require constant lubrication, and at best soon become worn and rattle with every jolt or jar to which the vehicle is subjected. Furthermore, with this usual type of connection each torsional movement of the spring is transmitted, as a stress or strain, to the chassis or frame of the vehicle, with the result that there is a force exerted tending to twist or rack the frame whenever any wheel of the vehicle rides over an obstruction or enters a depression in the roadway.

In the present invention, the enumerated disadvantages are overcome to a large extent, by providing connections which are in general ball bearings with only small or very limited areas of surface contact to wear, and which permit of substantially universal movement of the springs without such movement being transmitted to the vehicle frame. Further advantages and the specific details of my invention will now be described in connection with the accompanying drawings which form a part of this specification, and in which—

Fig. 1 is a side elevation of a spring as it appears when connected to the axle and chassis of a vehicle. In this instance, the illustration is of the front end of a motor vehicle.

Fig. 2 is a sectional view of the end connection at the left of Fig. 1;

Fig. 3 is a section on the line 3—3 of Fig. 2;

Fig. 4 is a sectional view similar to that of Fig. 2, illustrating the manner of connecting two leaves of a spring intended for use with heavier vehicles where a single leaf end would be insufficient to support the load;

Fig. 5 shows a slightly modified construction of the end connection of this invention;

Fig. 6 is a detail view illustrating one way of shaping the end of the long leaf of a spring to adapt it for use in the construction of Fig. 5;

Fig. 6ª shows an alternative way of securing the ball retaining means to the end of the spring;

Fig. 7 is a sectional elevation of the shackle end connection shown at the right of the assembly of Fig. 1;

Fig. 8 is a plan view in part sectional on the line 8—8 of Fig. 7; and

Fig. 9 is a sectional view on the line 9—9 of Fig. 7.

Referring now to Fig. 1, the front end of the side frame of a vehicle is shown at 1, and the leaf spring 2, resting upon the axle structure 3, is connected at its opposite ends to the frame of the vehicle in a manner to be now described. The connection at the left end of Fig. 1, which will be designated as a pivotal connection to distinguish it from the so-called shackle connection at the other end, is illustrated in detail in Fig. 2. A casting 4, secured by riveting, welding or other means to the end of the side frame 1, forms a terminal for this member and is provided with a curving outer contour which conforms to and continues the contour line of the side frame. The casting 4, is cored out in a manner to provide vertical and longitudinal openings intersecting at 90°. The horizontal opening shown at 5, is somewhat flared toward the outer end and in the direction of its longitudinal axis in order that movements of the spring, under changing loads, may take place without the spring contacting with the walls of the opening in the casting in which the end connection is mounted. The vertical opening in the casing 4, is cylindrical and opens downwardly. In the upper end of the same there is secured a bearing member 6, of bronze or other suitable bearing metal, which may be retained in position with a driving fit. The lower face of the member 6, extends into the opening 5, and is provided with a spherical concavity 7, in which the spherical bearing or ball 8 is seated. The latter is fixed in the outer end of the leaf element 9, of the spring. For the purpose of illustration, the manner of fixing the ball 8, in the leaf 9, is by up-setting the metal of the leaf so that supporting shoulders 10, are formed which engage the sphere below a median line and afford sufficient support to resist shearing strains between the ball and leaf when the spring is under load. It is obvious that other means of attaching could be used which would not only be capable of securing the ball in the leaf, but would also permit rotation of the ball with respect to the leaf. Such fastening means, however, is not favored, since it is preferred that the ball should rotate with respect to the bearing 6, which is easily renewable when worn.

From the lower side the ball 8, is engaged by a movable bearing member 11, which is cylindrical and arranged to slide in the vertical opening of the casting 4. The bearing 11, like 6, is of bronze or other suitable bearing metal and has a spherical depression or socket in its ball engaging surface and in which the ball 8, is seated. The bearing 11, is a hollow, piston-like element, the skirt of which guides its vertical movements. It is yieldingly pressed into engagement with the ball 8, by a coil spring 12, which exerts an upward pressure of sufficient degree on the bearing 11 so that the ball is always properly seated between the bearings 6 and 11, without there being any looseness or play between the contacting surfaces of the connection. The lower end of the vertical opening is threaded internally to receive the cap nut 13, and the latter supports the spring 12, as well as providing means for adjusting its compression. A washer 14, and a spring locknut washer are shown interposed between the cap 13, and the lower end of the casting 4. By removing the washer 14, the cap 13, can enter the casting to a greater extent in order to adjust or to increase the compression of the spring to compensate for excessive wear of the bearings 6 and 11. It is understood, however, that any usual wear on the bearings is automatically taken care of by the spring 12.

In assembling the connection, the ball having been secured in the leaf, and the bottom bearing 11, having been lowered as by removing the cap 13, the leaf end with the ball attached is inserted through the opening 5, until the ball 8, can be seated in the bearing 6, when the lower bearing 11 may be assembled. It will then be found that the ball is retained in a socket-like connection, which permits it to revolve about any of its axes, but restrains it, and through it the end of the spring, against a motion of translation with regard to the socket 4.

In Fig. 4, the same construction is illustrated, except that the end of the leaf spring carrying the ball 8, is two-ply or comprises two superposed leaves which may be necessary for larger and heavier vehicles. Since there should be provision for relative longitudinal movement between the leaves of a compound spring of this kind, only one leaf 9, is secured to the ball 8, while the leaf 9', is provided at the ball with an opening which is somewhat greater in dimension than the ball, so that as the spring structure flexes, the leaf 9', can be slightly extended without interfering with the end connection.

In Fig. 5, a modified construction of the pivotal end connection for springs is shown. Here the housing casting 4 is of the same construction as described in connection with the preceding figures. The ball 8, however, is secured in a spherical depression formed in the bent-over end 16, of the leaf 9. By making the upper leaf of the spring somewhat longer, the additional metal desirable for this construction is readily afforded, but a separate block of the dimensions of the part 16, could be secured to the end of the spring leaf 9, by welding or riveting to produce the same result, see Fig. 6ª, in which a separate block 16 is shown as riveted to spring 9 as at 25 or welded around the edges as at 26. The lower bearing member 11, is outwardly convex, and preferably presents a spherical surface to the underside of the leaf 9. As in the construction of Fig. 2, the lower bearing is yieldingly and adjustably supported, and functions to maintain assembly of the connection as well as to automatically compensate for wear. As the spring flexes in this construction, the ball 8 will turn about any one of its axes in the upper bearing 6, while the lower bearing may move vertically, making only a point contact with the underside of the leaf 9.

In Figs. 7, 8 and 9, there is shown the details of the shackle connection which is illustrated at the right hand end of the assembly view of Fig. 1. The purpose of a shackle end connection, as is known, is to permit of longitudinal flexing of the spring while sustaining the load, and to accomplish this result, there must be provision for relative longitudinal movement between the spring and load which it supports. While the specific details of the shackle connection shown are made the subject of a separate application conjointly filed, Ser. No. 19,394, filed March 30, 1925, it is described herein for the purpose of a combination disclosure.

The casting 17, is secured to the chassis element 1, (see Fig. 1) by bolts or rivets, and this casting follows in a general way the design of casting 4. It has intersecting cored openings, making a substantially hollow construction, the horizontal opening 18, being relatively long to take care of the longitudinal movement of the spring leaf 9, as it flexes under loading. In the upper side of the recess 18, there is secured a bearing member 19, grooved on its lower surface with a longitudinally extending groove conforming to the spherical surface of the ball 20. A similarly formed lower bearing member 21, is secured to the upper surface of the leaf 9 of the spring as by spot-welding or riveting. This element is clearly shown in plan view in Fig. 8, with the groove for the ball 20, extending lengthwise of the leaf 9. The grooves in the upper and lower bearing plates 19 and 21 form guide-ways for the ball 20, so that as the spring flexes the ball will make a rolling contact with the bearing plates. The end walls of the grooves form stops for the travel of the ball and limit the permissive longitudinal movement of the upper leaf of the springs. In torsional movements, the leaf 9 carries the bearing member 21, with it, tending to rotate the same about the ball 20, but the assembly of the connection is maintained by the upward pressure exerted by the bearing member 22, and the spring 23. The upper surface of the bearing 22, is spherical so that it presents only a very limited area of contact with the lower surface of the leaf 9, which reduces friction and minimizes wear. As in the pivotal connection at the opposite end of the spring, wear between bearings 19 and 21, is compensated for by the spring-pressed bearing member 22, which acts to maintain the elements of the connection in contact, and with a force which can be adjusted.

The opening in the terminal castings 4 and 17, which receives the ends of the spring, may be packed with lubricant after the end connection is assembled; and a leather or other flexible covering (gaiter) 24, may be provided to fit around the flaring inner end of the castings and to also encircle the spring to retain the lubricant. Such an arrangement is indicated in Fig. 2.

What I claim is:

1. End connections for securing a spring to the frame of a vehicle comprising ball members mounted on the ends of the spring and socket bearings therefor mounted on the frame, the socket bearing at one end of the spring being rigidly fixed to the frame to prevent lateral movement of the end of the spring in any horizontal plane but permitting torsional movement thereof without imposing any stress upon the frame.

2. Attaching means for connecting one end of a spring to the vehicle frame in order to secure the spring at this end against motion of translation with regard to the frame, but to permit pivotal movements of the spring in all directions, consisting of a ball and socket joint the ball element of which is solidly fixed in the end of the spring, while the socket is rigidly mounted in the vehicle frame, the socket comprising oppositely arranged cup bearings between which the ball is retained, one of the cup bearings being fixed with respect to the vehicle frame, and adjustable means for yieldingly pressing the other of the bearings into ball engaging and supporting position.

3. An end connection for securing a spring to a vehicle frame consisting of a ball and socket joint, the ball being mounted in the end of the spring, and the socket rigidly fixed in the vehicle frame, the said socket comprising oppositely disposed bearings for the ball which partly surround the same, one of the bearings being fixed while the other is movable and is pressed into contact with the ball by yielding adjustable means.

4. An end connection for securing a spring to a vehicle frame consisting of a ball and socket joint, the ball being mounted in the end of the spring, and the socket rigidly fixed in the vehicle frame, the said socket comprising oppositely disposed bearings for the ball which partly surround the same, one of the bearings being fixed, while the other is adjustably movable so as to engage the ball with varying degrees of contact pressure.

5. An end connection for attaching a spring to a vehicle which permits pivotal movement of the spring about the connection but prevents any motion of translation by the spring, comprising a hardened steel ball secured on the end of the spring, a bearing member rigidly carried by the vehicle frame which partially embraces the ball and retains the same against displacement relative thereto, and yielding supporting means for holding the ball to its bearing.

6. Attaching means for securing one end of a spring to a vehicle, comprising a vehicle frame element and a hollow casting secured at one end of said element to form a housing for the attaching means, a leaf spring element having one end extending into the housing, and a hardened steel ball solidly mounted in the end of the spring element with portions of the surface of the ball extending above and below the leaf, socket bearings for the ball arranged on opposite sides of the leaf and retained in vertical recesses in the housing, the upper bearing being fixed in the casting, the lower bearing being spring supported and means for adjusting the contact pressure between the ball and its bearings.

7. Attaching means for securing one end of a spring to a vehicle, comprising a vehicle frame element and a hollow casting secured at one end of said element to form a housing for the attaching means, a leaf spring element having one end extending into the housing, and a hardened steel ball solidly mounted in the end of the spring element with portions of the surface of the ball extending above and below the leaf, socket bearings for the ball arranged on opposite sides of the leaf and retained in vertical recesses in the housing, the upper bearing being fixed in the casting, the lower bearing being yieldingly and adjustably supported and means for removing this bearing from the housing to facilitate the assembly and disconnection of the spring attaching means.

8. An end connection for a spring to a vehicle frame consisting of a ball and socket joint, and an enclosing housing for the joint rigidly associated with the end of a vehicle frame element, the ball of the joint being solidly fixed in the spring and near one end thereof, while the socket is mounted in the housing carried by the vehicle frame and comprises upper and lower bearings which partly surround the ball, one of the said bearings being yieldingly supported to compensate for wear of the bearing surfaces, while the other bearing is rigidly supported by the housing.

AXEL W. KOGSTROM.